US006832312B1

(12) United States Patent
Rochford, II

(10) Patent No.: US 6,832,312 B1
(45) Date of Patent: Dec. 14, 2004

(54) PROCESS FOR AUTOMATICALLY INSTALLING VIDEO DISPLAY SOFTWARE UPON DETECTING NEW VIDEO DISPLAY CONTROLLER

(75) Inventor: Keith G. Rochford, II, Fullerton, CA (US)

(73) Assignee: EVGA.Com, Brea, CA (US)

( * ) Notice: Subject to any disclaimer, the term of this patent is extended or adjusted under 35 U.S.C. 154(b) by 461 days.

(21) Appl. No.: 09/747,783

(22) Filed: Dec. 22, 2000

Related U.S. Application Data

(60) Provisional application No. 60/171,832, filed on Dec. 22, 1999.

(51) Int. Cl.$^7$ .............................. G06F 9/24; G06F 13/10
(52) U.S. Cl. ............................... 713/100; 713/1; 710/8; 717/174; 345/719
(58) Field of Search ............................... 713/1, 2, 100; 345/581, 629, 719; 717/100, 120, 168, 169, 174, 175; 710/8, 10, 64, 72, 301, 104

(56) References Cited

U.S. PATENT DOCUMENTS

| 5,926,166 | A  | * | 7/1999 | Khederzadeh et al. | ...... 345/581 |
| 6,049,871 | A  | * | 4/2000 | Silen et al. | ..................... 713/2 |
| 6,282,709 | B1 | * | 8/2001 | Reha et al. | ................. 717/175 |
| 6,345,319 | B2 | * | 2/2002 | Lin et al. | ........................ 710/8 |
| 6,359,631 | B2 | * | 3/2002 | DeLeeuw | .................. 345/629 |
| 6,367,072 | B1 | * | 4/2002 | Justice et al. | ............... 717/168 |

FOREIGN PATENT DOCUMENTS

JP          10191285 A  *  7/1998  ............ H04N/7/10

OTHER PUBLICATIONS

Richard Edgar—"Diamond Instructions for Stealth64"—Feb. 26, 1995—Newsgroups: comp.os.os2.setup.*

Gary Hammer—"Stealth 64 VRAM Warp Install—Update"—Mar. 23, 1995—Newsgroups: comp.sys.ibm.pc.hardware.video, comp.os.os2.multimedia, comp.os.os2.setup.*

Robert J. Niland—"New Video Card Install"—Dec. 31, 1998—Newsgroups: comp.sys.hp.misc.*

* cited by examiner

Primary Examiner—Lynne H. Browne
Assistant Examiner—Thuan Du
(74) Attorney, Agent, or Firm—Burns, Doane, Swecker & Mathis LLP

(57) ABSTRACT

A method and system of an automated computer video display driver management system in setting up a video driver for a corresponding video display controller adapter is disclosed. The process including the steps of executing an automated driver management program prior to replacing a new controller with an old controller in the system; copying a predetermined program for subsequent execution in a rebooting process to the computer system; invoking command keystrokes in accordance to the version of the operating system being executed in the computer system; setting up reboot registry in the computer system; rebooting the computer system; configuring the computer system with standard video graphics adapter driver upon installing a new video display controller; rebooting the computer system again; and scanning for a second predetermined program for selecting a corresponding software driver for the corresponding video display adapter.

9 Claims, 3 Drawing Sheets

PROCESS FOR AUTOMATICALLY INSTALLING VIDEO DISPLAY SOFTWARE UPON DETECTING NEW VIDEO DISPLAY CONTROLLER

CROSS REFERENCE TO RELATED APPLICATIONS

Reference is made and priority claimed from U.S. provisional Application Ser. No. 60/171,832, filed Dec. 22, 1999, entitled "Method and Apparatus for Automated Driver Management."

COPYRIGHT NOTICE

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

REFERENCE TO A COMPUTER PROGRAM LISTING APPENDIX

Reference is made to a computer program listing appendix contained within a file named Rochford__09-747,783.txt, 13.0K bytes, created Nov. 07, 2003, provided on compact disk, the contents of which are hereby incorporated by reference.

BACKGROUND OF THE INVENTION

1. Field of the Invention

The present invention relates generally to the field of setting up a computer videodriver, and more particularly to the method and apparatus of an automated computer video driver management system in setting up a video driver in accordance with the video controller utilized in the computer system.

2. Description of the Prior Art

FIG. 1 is a flow diagram illustrating the process of installing a new video interface controller in a computer system. As shown in. FIG. 1, conventionally, replacing a video interface controller card in a computer system involves the following process:

A) power off the computer system to avoid causing damage to components or hazards for the person who is going to install the new video controller card (step 10);
B) remove the computer case cover to gain access to the bus for installing the new video controller card or remove the pre-existing video controller card in the system (step 12);
C) remove the old video controller adapter (step 14);
D) install the new video controller adapter in the bus of the computer system (step 16);
E) replace the case cover (step 18);
F) power on the computer system (step 20); and
G) follow video controller adapter manufacturer's directions for installing the video display driver for the new adapter (step 22).

The problem with this process is that in some cases the preexisting display drivers are not correctly removed from the system and the new display adapter tries to use those old drivers. This will result in a botched installation and will limit function to a standard VESA SVGA screen display of 640×480×4 bit color.

The above-identified problem occurs because the Windows System Registry contains no entry for a Standard VGA PCI graphics adapter device. As a result, the system is forced to identify all new video graphics adapters with the drivers it already has installed in the system. However, the driver installed previously is invariably incorrect for the new video controller adapter.

When installing an upgrade P&P (Plug and Play) graphics adapters in a Microsoft Windows 95 and Windows 98 (and presumably the upcoming Windows Millennium) operating systems, the computer will be confused and attempt to use the video display drivers for the previous graphics adapter with the new graphics adapter. The result of this is that a computer system whose graphical operations are limited to a bare minimum of functionality and requires the services of a skilled technician to correct the problem.

SUMMARY OF THE INVENTION

Automated Driver Management (ADM) addresses this problem by interacting with the user's computer system before a new graphics adapter is installed. When run, ADM actively causes the computer system to install the Standard PCI Graphics Adapter driver that is inherent to all Microsoft Windows operating systems. This driver provides a wide degree of compatibility and is suitable for the purposes of graphic adapter upgrades. This guarantees that the older video graphics driver has been removed and will not interfere with the installation of a new graphics adapter.
The Result This process will streamline the installation process for video graphics adapter upgrades. It will heighten the end-user experience and help to build product confidence by making the process simple, dependable, and seamless. It will additionally result in a lower incidence of technical support call backs, thereby lowering the resources required to support the distribution of video graphics adapters for the upgrade market.

These and other objects and advantages of the present invention will no doubt become apparent after reading the following detailed description of the preferred embodiments which are illustrated in the several figures of the drawing.

IN THE DRAWINGS

DETAILED DESCRIPTION OF THE PREFERRED EMBODIMENTS

The present invention provides a method for an automated video display driver management system. The automated video display driver management system of the present invention uses a very simple and straightforward methodology to accomplish the task of installing a driver for a video display controller adapter. The invention can be executed via Win32 API through the following process:

1) identify the operating system (OS) version of the target system and direct the code execution to the proper subroutines based on the OS version;

2) open the display control panel;

3) feed the installation sequence to the display control panel utilizing the KeyBd_Event API.

Figure 1:
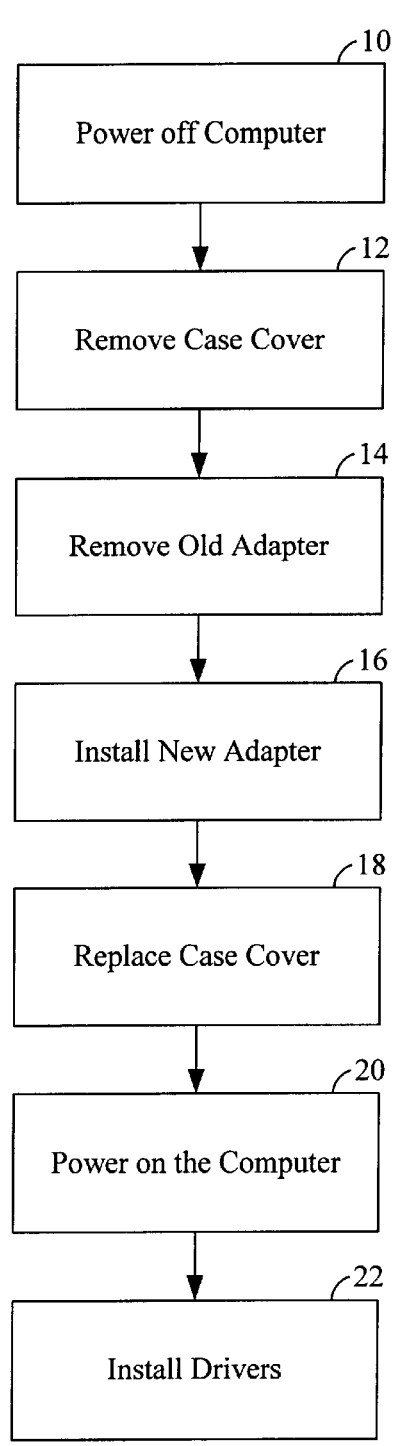
FIG. 1 is a diagram illustrating the conventional process of installing a new video interface controller in a computer system.
Figure 2:
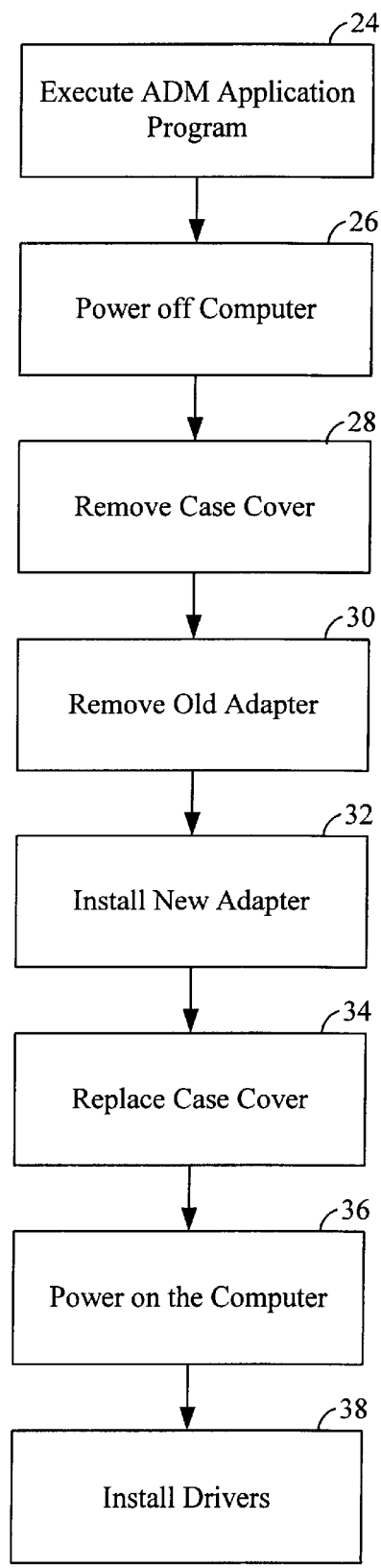
FIG. 2 is a flow diagram illustrating an exemplary process of installing a new video interface controller in a computer system of the preferred embodiment of the present invention.

As illustrated in FIG. 2, the present invention discloses a method that simplifies the process of installing a corresponding software driver when a new video controller board is installed in a computer system. The process includes the following operation:

A) execute a proprietary automated driver management (ADM) application program (step 24); (please see FIG. 3 for details of ADM operation).

B) power off the computer system to avoid causing damage to components or hazards for the person who is going to install the new video controller card (step 26);

C) remove case cover to gain access to adapter cards (step 28);

D) remove the pre-existing video display controller adapter from the system bus to free up space for the new video display-controller adapter (step 30);

E) install the new video display controller adapter in the system bus (step 32);

F) replace the case cover to protect adapter cards (step 34);

G) power on the computer to get it working again (step 36);

H) follow manufacturer's directions for installing the drivers for the new adapter (step 38).

This method, with ADM being run first, eliminates the problems of a new display adapter trying to use drivers for the old display adapter. Note how it fits seamlessly into the standard installation process.

Figure 3:
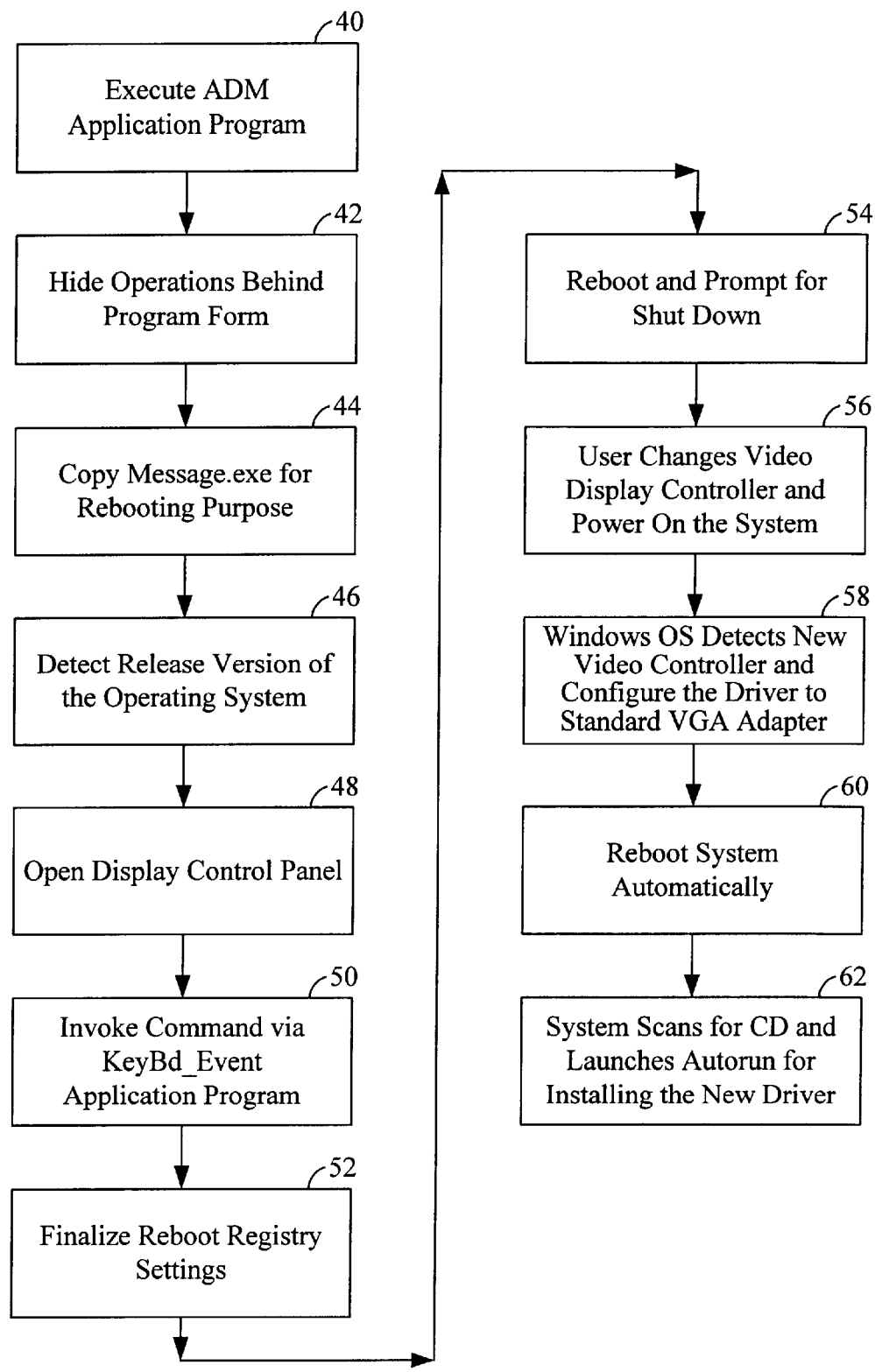
FIG. 3 is a flow diagram illustrating an exemplary embodiment of the ADM process of the present invention.

FIG. 3 is a flow diagram illustrating an exemplary embodiment of installing the software driver for the newly installed video display controller adapter in the ADM process of the present invention. The process of automatically installing a corresponding software driver for a new video display controller board comprises the following operation:

A) User selects the "Run ADM" option from the main installation screen of the installer CD to execute the ADM application program (step 40);

B) The execution of ADM application program operation is not being displayed in the program form (step 42). In one embodiment, a form containing a proprietary graphics in the form of a thermometer style progress bar or an hour-glass is being displayed in stead. This is done to allow the user to monitor the progress of the operation. without actually seeing all of the system operations in action.

C) A secondary program file called Message.exe is copied over to user system from the installation disk (step 44). This program will be used in subsequent process of the ADM driver installation operation. This file is copied over at this point because the full operation of the ADM program requires the computer system to be rebooted after the installation operation is complete. In one embodiment of the invention, the installation disk is in the form of a compact disk.

When the computer system reboots, it looses all information that has not been saved to the hard drive. With the message file copied over, and with the registry setting that is implemented in subsequent step H to be described, the ADM program will be able to pick up where it left off when the computer starts back up after a necessary reboot.

D) ADM identifies the version of the operating system under which the system is running (step 46). This is done by examining the major and minor product release version information stored in the System Registry and interpreting the operating system type based on those version numbers. This is done because different version of the Windows operating systems use different menu systems to interact with the Windows Display Control Panel. It is essential that the operating system release version be identified for the ADM operation to be successfully performed. By detecting the operating system, the program will be able to choose the correct sequence of keystrokes that are needed to navigate the Display Control Panel.

E1/E2) These are the two different subroutines that are used to contain the instructions to be used based on the operating system type. One subroutine exists for each operating system that the program supports (Windows 95 and Windows 98). Both of these subroutines use the method described in step G (sending keyboard commands to the Display Control Panel), but they each use a different sequence of keystrokes depending on the operating system version.

F) Next is to open the Display Control Panel under the Windows operating system (step 48). This process begins the main execution operation for ADM. At this point, the Windows Display Control Panel is opened so that the ADM program will have full access to it. This is conducted by making a standard system call and running the desk.cpl file (which is the Display Control Panel in Windows 95 and Windows 98).

G) Next is to invoke command keystrokes via KeyBd Event application program (step 50). This is the most important portion of the program's operation. At this point, keyboard commands are automatically sent to the Windows Display Control Panel that was opened just prior to this process step.

The commands are sent using the Win32 API Keybd Event, a standard Windows system call. There is a delay of between 1500 and 3000 milliseconds between the issuance of each command to provide the computer with sufficient time to process each command before the next is issued. While a delay of 500 milliseconds was found to be appropriate, these longer delay in timing is provided ensure that certain computers not equipped with the latest technology that may be slower than the most up-to-date computer technology would also have sufficient time to process each step. This delay can be eliminated (as is planned in the next revision of the software) by examining the state of the Windows Display Control Panel and only allowing the ADM program to continue to the next command when the Display Control Panel has finished processing the last command. This will result in a very big boost in program execution time (thereby lowering the time needed to execute the program).

The sequence of keystrokes being most important to ADM, are provided below:

In a Windows 98 environment, the keystroke sequence is:

ALT-D—Presses advanced button
CTL-TAB—Moves to settings tab
ALT-C—Presses change button
ENTER—Presses next button
DOWN—Presses down arrow (to display a list of all drivers)
ENTER—Presses next button
ALT-A—Chooses show all hardware
ALT-M—Moves focus to manufactures section
HOME—Chooses first item in manufacturers section
ALT-D—Moves focus to device section
DOWN—Presses down arrow
DOWN—Presses down arrow (standard pci vga adapter is now selected)

ENTER—Presses next button
ENTER—Presses next button
ENTER—Presses next button
ALT-A—Presses apply button
ENTER—Presses close button
In a Windows 95 environment, the keystroke sequence is:
ALT-A—Presses advanced button
ALT-C—Presses change button
ALT-A—Chooses show all hardware
ALT-M—Moves focus to manufacturers section
HOME—Chooses first item in manufacturers section
ALT-D—Moves focus to device section
DOWN—Presses down arrow
DOWN—Presses down arrow (standard pci vga adapter is now selected)
ENTER—Presses next button
ALT-A—Presses apply button
TAB—Moves focus to next button/object
TAB—Moves focus to next button/object
ENTER—Presses OK button
TAB—Moves focus to next button/object
TAB—Moves focus to next button/object
TAB—Moves focus to next button/object
ENTER—Presses close button After executing one of these subroutines, they both pass control of the program to a finishing routine in step 52 as shown in FIG. 3. In this routine there is one final keystroke that is issued and is the same for both Windows 95 and Windows 98. This is ENTER—it presses or selects the "OK" button for the confirmation dialog box that is asking if it is "OK" to reboot the computer system at this time. The "OK" must be selected or pressed so that the system reboots and the changes that have been made for the newly installed video display controller adapter can take effect. As each keystroke is issued, the thermometer bar or hour-glass as described in step 42 above increments itself in order to give an ongoing display of progress to the user.

H) Next step is to finalize the Reboot Registry settings (step 52). In this step the final entries are made to the system registry. The most important of which is the RunOnce entry to the KLM/Software/Microsoft/Windows/CurrentVersion/RunOnce registry key that makes the computer call the Message.exe program immediately when the system is rebooted. The other step is the final issuance of a keystroke (the ENTER key) that allows the computer to reboot—as mentioned at the end of step 50 described above.

I) Next step is to reboot the computer system (step 54). The computer reboots and Message.exe is being executed before the operating system can fully load, due to the registry entry that was made for it in step 52. This is a very simple program that instructs the user to perform subsequent steps in the installation process (such as physically removing the pre-existing video display controller adapter and installing the new one) and then shuts off the power to the computer. Please see FIG. 4 for more detailed description regarding the process in the Message.exe program.

J) The user substitutes the pre-existing video display controller adapter with the new adapter, and proceeds to power on the computer system (step 56).

K) During the process of rebooting the computer system, Windows recognizes a new video display adapter has been installed, and will not attempt to use drivers from the previous adapter. It will set the active display driver to the Standard VGA Adapter driver that is common to all versions of Windows and it will then cause the computer to be rebooted (step 58).

L) Once the operating system detects the new video display controller adapter, it reboots the computer system automatically with the standard VGA drive (step 60). This is the rebooting that Windows will do on its own as described in step 58. This step is needed to allow Windows an opportunity to reload all of the updated settings in effect.

M) After the computer boots up this time, a command left in the HKLM/Software/Microsoft/Windows/CurrentVersion/RunOnce registry key (entered by the Message.exe program that executed in step 54 described above) will tell it to execute a program on the main installation CD that brings up a proprietary installation screen, so that the user can choose the install driver option in order to finalize the installation of their graphics adapter (step 62).

Figure 4:
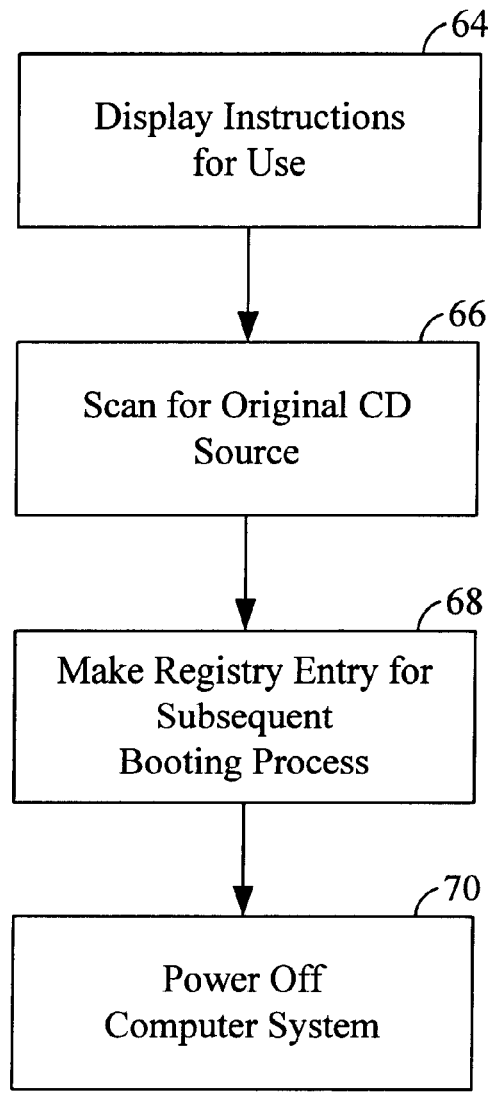
FIG. 4 is a flow diagram illustrating an exemplary process in the message.exe program of the present invention.

FIG. 4 is a flow diagram illustrating an exemplary process in the message.exe program of the present invention. Message.exe is a simple program that is meant to be a helper program for ADM of the present invention. It is used primarily to provide feedback and information to the user so that they retain a sense of control over the installation operation of the present invention. While all of the ADM and Message.exe operations could be done without any feedback to the user at all, most users would develop a very disconcerted feeling if they saw their computer engaging in so many processes with no feedback whatsoever. The operation of the program message.exe includes the following processes:

A) A standard program form is created that contains text information advising the user that the computer system will now be shut down and that they are to remove their old graphics adapter and install a new one (step 64). It further refers the user to his or her owner's manual. This is a user interface feature and is not extremely important to the overall operational process. There is also a button created on this form that following steps (steps 66–70) will be executed if the button is when clicked.

B) Message.exe now looks for the original source CD by scanning through the drive letters from lowest to highest looking for the CD (step 66). When it finds the CD it notes its location and exits the process step. It is essential to conduct this step 66 because a proprietary setup program must be executed automatically for the user when the last reboot for ADM occurs (in step 62 illustrated in FIG. 3). With this information, the location of the CD in the system can be recorded and then refer to it in future operations when necessary.

C) The location of the CD is entered into the HKLM/Software/Microsoffi!Windows/CurrentVersion/RunOnce registry key for use in 5 the next full reboot in order to automatically launch our setup CD (step 68).

D) The computer is powered off (step 70) so that the user can remove pre-existing video display controller card and install a new one.

While the invention has been particularly shown and described with reference to the preferred embodiments, it will be understood by those skilled in the art that many other modifications and variations may be made thereto without departing from the broader spirit and scope of the invention as set forth in the claims. The specification and drawings are accordingly to be regarded as illustrative, rather than in a restrictive sense.

What is claimed is:

1. A process for installing a video display software driver in a computer system, comprising:
    providing a Automatic Driver Management program for automatically copying a predetermined program for subsequent execution in a rebooting process to the computer system,
- invoking command keystrokes,
- setting up reboot registry in the computer system,
- rebooting the computer system,
- configuring the computer system with standard video graphics adapter driver upon installing a new video display controller, and
- scanning for a second predetermined program for selecting a corresponding software driver for the new video display controller;

loading said Automatic Driver Management program in said computer system; and running said Automatic Driver Management program.

2. A process for installing a video display software driver in a computer system, comprising:
- providing a Automatic Driver Management program for automatically
  (1) executing a sequence of command keystrokes operative to configure the computer system with a standard video graphics adapter driver upon installing a new video display controller, and
  (2) executing a program operative to select a corresponding software driver for said new video display controller;

loading said Automatic Driver Management program in said computer system; and running said Automatic Driver Management program.

3. A process as recited in claim 2, wherein said Automatic Driver Management program detects the release version of the operating system on said computer system.

4. A process as recited in claim 2, wherein executing said sequence of command keystrokes includes rebooting the computer system.

5. A process as recited in claim 4, wherein rebooting the computer system includes displaying instructions for installation of said new video display controller.

6. A process as recited in claim 4, wherein the computer system is shut down subsequent to rebooting.

7. A process as recited in claim 2, wherein running said Automatic Driver Management program includes displaying a graphic progress indicator.

8. A process as recited in claim 7, wherein said graphic progress indicator is a moving bar graph.

9. A process as recited in claim 7, wherein said graphic progress indicator is an animated hour glass.

\* \* \* \* \*

UNITED STATES PATENT AND TRADEMARK OFFICE
CERTIFICATE OF CORRECTION

PATENT NO.     : 6,832,312 B1
DATED          : December 14, 2004
INVENTOR(S)    : Keith G. Rochford II It is certified that error appears in the above-identified patent and that said Letters Patent is hereby corrected as shown below:

Title Page,
Item [54], Title, should read -- PROCESS FOR AUTOMATICALLY INSTALLING VIDEO DISPLAY SOFTWARE DRIVER UPON DETECTING NEW VIDEO DISPLAY CONTROLLER --

Signed and Sealed this

Fifteenth Day of March, 2005

JON W. DUDAS
*Director of the United States Patent and Trademark Office*